United States Patent [19]

Sellers et al.

[11] 3,770,331

[45] Nov. 6, 1973

[54] COMBINATION BEARING SEAT FOR MOTORS

[75] Inventors: Jerry W. Sellers; Robert W. Taylor, both of Jackson, Tenn.

[73] Assignee: Rockwell International Corporation, Pittsburgh, Pa.

[22] Filed: Sept. 2, 1971

[21] Appl. No.: 177,888

[52] U.S. Cl. .................. 308/72, 308/189, 310/50
[51] Int. Cl. ........................................ F16c 35/00
[58] Field of Search ............... 308/72, 189; 310/50

[56] References Cited
UNITED STATES PATENTS
1,025,884  5/1912  Schmitt ............................. 308/72
2,951,254  9/1960  Cole et al. ......................... 308/72

FOREIGN PATENTS OR APPLICATIONS
522,668  6/1940  Great Britain ..................... 308/72

*Primary Examiner*—Charles J. Myhre
*Assistant Examiner*—Barry Grossman
*Attorney*—William A. Strauch et al.

[57] ABSTRACT

A combination bearing seat structure for supporting a motor shaft-journalling bearing having either a cylindrical bearing seat-engaging surface or a segmental spherical bearing seat-engaging surface. The combination bearing seat structure has two axially spaced apart segmental spherically contoured seats and an intermediate cylindrically coutour seat. The cylindrically coutoured seat provides the support surface for the cylindrical bearing, and the spherically contoured seats provide the support surfaces for the spherically contoured bearing.

15 Claims, 7 Drawing Figures

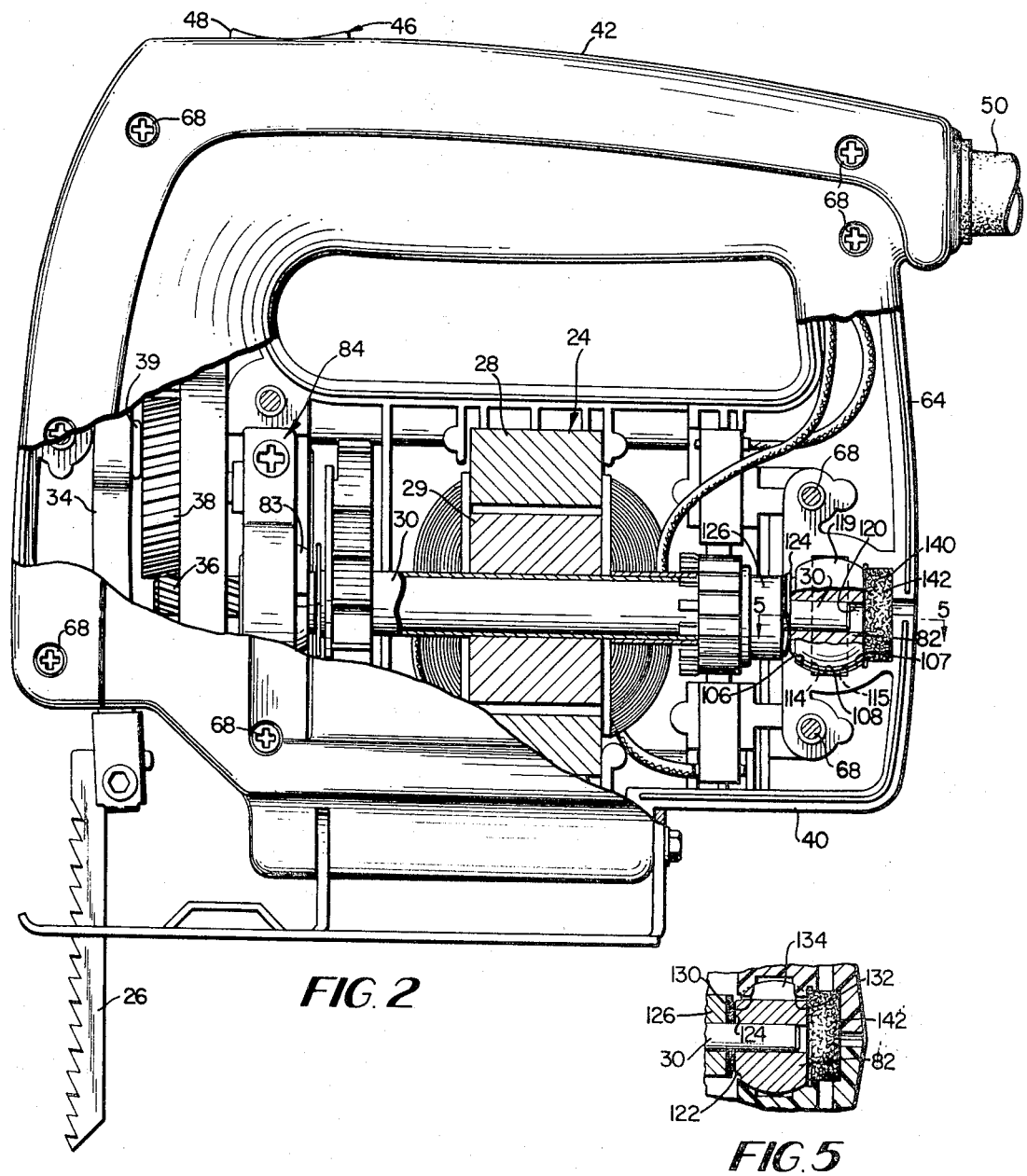
FIG. 2
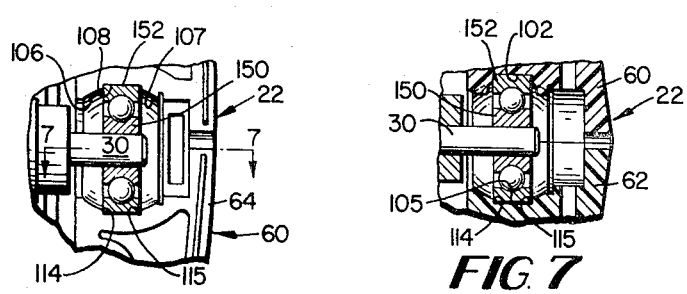
FIG. 5
FIG. 6
FIG. 7
INVENTORS
JERRY W. SELLERS
ROBERT W. TAYLOR
BY Strauch, Nolan, Neale, Nies & Kurz
ATTORNEYS

COMBINATION BEARING SEAT FOR MOTORS

FIELD OF INVENTION

This invention relates to bearing seat structures which are especially adapted for power operated tools.

BACKGROUND

In the type of electrically powered tool described in U.S. Letters Pat. No. 3,411,024 (issued to G. E. Moffey Jr. On Nov. 12, 1968), the seats for the motor armature shaft bearings are formed in complementary halves of a longitudinally split, clam shell-type casing. These bearing seats are contoured to matingly interfit with the outer peripheries of the armature shaft bearings. The outer peripheries of the armature shaft bearings are spherically contoured for limited rocking motion in the correspondingly contoured sockets that are defined by the split casing. In this manner, the bearings are self-aligning with the armature shaft.

With the foregoing conventional construction it will be appreciated that if it is desired to replace the spherically contoured armature shaft bearings with roller or other bearings having cylindrically contoured seat-engaging surfaces, the casing, as a practical matter, must be replaced with one that has cylindrically contoured bearing seat surfaces. As a result, different casings must be fabricated and stocked to accommodate the differently contoured bearings.

SUMMARY & OBJECTS OF INVENTION

The present invention provides a bearing seat structure which will accommodate both of the spherical and cylindrical types of bearings mentioned above. As a result, the expense of fabricating and stocking a different casing for each of the types of bearings mentioned above is avoided. In brief, this is accomplished by forming the combination bearing seat structure with two axially spaced apart spherically contoured seats and with an intermediate, cylindrically contoured bearing seat. The cylindrically contour bearing seat is disposed axially between the spherically contoured seats and is recessed relative to the spherically contoured seats to receive a bearing having a cylindrical, outer, bearing seat-engaging periphery. This type of bearing is axially confined between shoulders at the junctures between the cylindrically contoured seat and the two axially spaced apart spherically contoured seats.

The axially spaced apart spherically contoured seats are contained in substantially a common spherical envelope to thus provide the seating surface for a bearing having a spherically contoured periphery.

In further accordance with this invention, the above-described spherical and cylindrical bearing seats are interiorly formed on a longitudinally split casing. In this manner, the complementary halves of the split casing both define segments of each of the spherically and cylindrically contoured bearing seats, and both types of bearing mentioned above are adapted to be trapped between the complementary casing halves and confined in place solely by separable seating surface engagement with the interior seating surfaces of the casing halves.

Accordingly, a major object of this invention is to provide a novel combination bearing seat structure that will accommodate bearings having both spherically contoured and cylindrically contoured outer peripheries.

Another object of this invention is to provide such a combination bearing seat structure in the casing of a power-operated tool.

Still another object of this invention is to provide such a combination bearing seat in a casing that is longitudinally divided into mating shells and that confines either type of the two above-mentioned bearings in the casing only by separable seating surface engagement with the seating surfaces on the casing shells.

Further objects of this invention will appear as the description proceeds in connection with the appended claims and the below-described drawings.

DESCRIPTION OF DRAWINGS

FIG. 2 is a side elevation of the sabre saw shown in FIG. 1 with one of the halves of the longitudinally split casing partially broken away to illustrate interior details;

FIG. 3 is a fragmentary side elevation on one of the casing shells shown in FIG. 2;

FIG. 4 is a fragmentary side elevation of the other casing shell shown in FIG. 2;

FIG. 5 is a section taken substantially along lines 5—5 of FIG. 2;

FIG. 6 is a fragmentary side elevation similar to FIG. 2 but showing a cylindrically contoured bearing mounted in the casing in place of the spherically contoured bearing; and FIG. 7 is a section taken substantially along lines 7—7 of FIG. 6.

DETAILED DESCRIPTION

Figure 1:
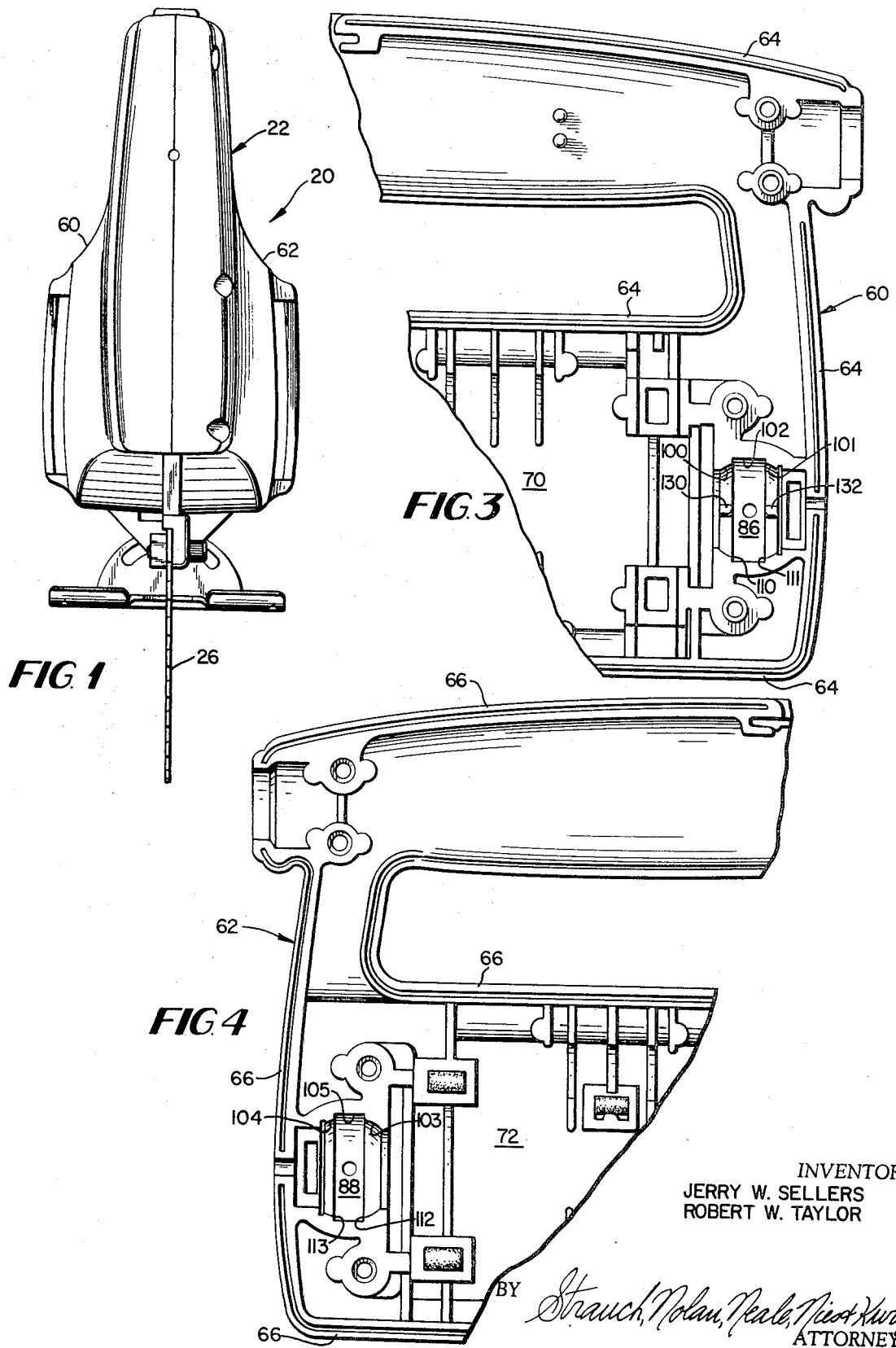
FIG. 1 is a front elevation of a sabre saw incorporating the principles of this invention.

The combination bearing seat structure of this invention is described below the conjunction with an electrically powered sabre saw. However, it will be appreciated that the combination bearing seat of this invention may be utilized in numerous other tools and mechanisms. For example, it may be utilized in the tool shown in the previously mentioned U. S. Pat. No. 3,411,024, in the portable hand drill described in U.S. Letters Pat. No. 3,536,943 (issued to L. H. Bowen III et al. on Oct. 27, 1970) or in a hedge trimmer.

The sabre saw illustrated in FIGS. 1 and 2 and incorporating the principles of this invention is generally designated at 20 in FIGS. 1 and 2. Sabre saw 20 comprises a hollow, longitudinally split, clam shell type housing or casing 22. Casing 22 contains the drive mechanism which includes an electric motor 24 (FIG. 2) for reciprocating a cutter blade 26.

Motor 24 may be of any suitable, conventional construction and, as best shown in FIG. 2, comprises a stator 28 having field windings peripherally surrounding an armature 29. Armature 29 is mounted on an armature shaft 30 which extends coaxially through stator 28 and which is drive connected to a reciprocally supported blade holder 34 by any suitable, conventional means. Blade 26 is mounted on the lower end of blade holder 34 in any suitable, conventional manner. In the embodiment shown in FIGS. 1 and 2, a gear 36 is formed on the inboard end of armature shaft 30 and constantly meshes with a rotatably supported idler gear 38. Idler gear 38 is drive connected to blade holder 34 by a scotch yoke connection which is generally indicated at 39 in FIG. 2.

With continued reference to FIGS. 1 and 2, housing 22 has a hollow body portion 40 which receives motor 24, blade holder 34 and the other drive mechanism parts mentioned above. In addition, housing 22 is formed with a hollow handle grip portion 42. Handle grip portion 42 houses an electric on-off switch 46 having a manually manipulatable switch actuator 48 for controlling operation of motor 24. A power cord 50 has conductors for supplying operating current to motor 24 under the control of switch 46.

Housing 22 is divided longitudinally of the rotational axis of motor 24 into two complementary shells 60 and 62 to provide a clam shell type enclosure for the internal parts of the sabre saw. Shells 60 and 62 are separately molded from a suitable plastic and have oppositely dished curvatures to define interior, mechanism-receiving cavities.

Shells 60 and 62 are respectively formed with mating longitudinal edge surfaces 64 and 66 which seat against each other along a substantially planar interface that longitudinally and medially intersects body portion 40 and handle portion 42. The rotational axis of shaft 30 lies substantially in a plane containing this interface. Machine screws 68 (see FIG. 2), extending through bores in shell 62, are threaded into tapped bores in shell 60 to firmly and rigidly secure shells 60 and 62 together.

With continued reference to FIGS. 2-4, shells 60 and 62 are respectively formed with ribbed, complementary cavities 70 and 72 which mate to form a motor compartment that interfittingly receives and confines stator 28.

The outboard end of shaft 30, as shown in FIG. 2, is journalled in a bearing 82. The inboard end of shaft 30 is journalled in a further bearing 83. Bearing 83 may be mounted in a bearing holder indicated at 84.

In FIG. 2, bearing 82 is shown to be a spherically contoured knuckle, and as will be described in greater detail shortly, is seated for limited universal rocking movement in opposed complemental cavities 86 (FIG. 3) and 88 (FIG. 4). Cavities 86 and 88 define a socket for receiving bearing 82.

As shown in FIGS. 3 and 4, cavities 86 and 88 are respectively formed in shells 60 and 62, and bearing 82 is trapped and thus confined in position between shells 60 and 62 only by separable seating engagement with the shell surfaces that define cavities 86 and 88.

As shown in FIG. 3, cavity 86 is formed by two smooth, axially spaced apart, spherically contoured bearing seating surfaces 100 and 101 and with a smooth, intermediate cylindrically contoured bearing seating 102 of uniform radius. Surfaces 100–102 are formed on the interior of shell 60.

As shown in FIG. 4, cavity 88 is similarly formed by two smooth, axially spaced apart, spherically contoured bearing seating surfaces 103 and 104 and with a smooth, intermediate cylindrically contoured bearing seating surface 105 of uniform radius. Surfaces 103–105 are formed on the interior of shell 62.

Surfaces 100 and 103 are complementary and define two 180 degree segments of an spherically contoured, annular-like bearing seat which is indicated at 106 in FIG. 2. Surfaces 101 and 104 are also complementary and define two 180° segments of a spherically contoured annular-like bearing seat which is indicated at 107 in FIG. 2. Likewise, surfaces 102 and 105 are complementary and define two 180° segments of a cylindrically contoured annular bearing seat which is indicated at 108 in FIG. 2. Seat 108 has a substantially uniform diameter.

Seats 106–108 peripherally surround bearing 82 and are formed about a substantially common longitudinal axis that closely axially aligns with the rotational axis of shaft 30. The common axis of seats 106–108 is contained in the plane passing through and containing the interface between the abutting shell edge surfaces 64 and 66. Surfaces 100, 101, 103 and 104 are substantially contained in a common spherical envelope.

As shown in FIG. 3, seating surface 102 axially spans the space between surfaces 100 and 101 and is recessed radially outwardly relative to surfaces 100 and 101. Shell 60 is interiorly stepped to recess seating surface 102 and to form axially opposed annularly extending shoulder surfaces 110 and 111. Shoulder surfaces 110 and 111 axially face each other and are substantially coextensive. Shoulder surface 110 is formed at the juncture between surfaces 100 and 102, and shoulder surface 111 is formed at the juncture between surfaces 101 and 102.

As shown in FIG. 4, seating surface 105 axially spans the space between surfaces 103 and 104 and is recessed radially outwardly relative to surfaces 103 and 104 in the same manner as described in connection with cavity 86. Shell 62 is correspondingly interiorly stepped to recess seating surface 105 and to form corresponding axially opposed, annularly extending shoulder surfaces 112 and 113. Shoulder surfaces 112 and 113 face each other and are substantially coextensive. Shoulder surface 112 is formed at the juncture between surfaces 103 and 105, and shoulder surface 113 is formed at the juncture between surfaces 104 and 105.

Shoulder surfaces 110 and 112 are complementary and define two 180° segments of an annular shoulder that is indicated at 114 in FIG. 2. Similarly, shoulder surfaces 111 and 113 are complementary and define two 180° segments of an annular shoulder that is indicated at 115 in FIG. 2. Shoulders 114 and 115 each lie in a plane that perpendicularly intersects the common longitudinal axis of seats 106–108.

The bearing socket defined by seats 106–108 and shoulders 114 and 115 is substantially symmetrical about a medial plane passing through the interface between edge surfaces 64 and 66 and containing the longitudinal axis of seats 106–108. Shoulders 114 and 115 are coaxial with the common longitudinal axis of seats 106–108. Surfaces 100–102 are substantially symmetrically about a plane medially intersecting surface 102 and extending perpendicularly of the common longitudinal axis of seats 106–108. Similarly, surfaces 103–105 are substantially symmetrical about a plane medially intersecting surface 105 and extending perpendicularly of the common longitudinal axis of seats 106–108.

As shown in FIGS. 2 and 5, bearing 82 has an spherically contoured periphery 119 which interfittingly seats against seating surfaces 100, 101, 103 and 104. Bearing 82 is trapped in place in casing 22 and thus supported by casing 22 only by separable seating surface engagement with surfaces 100, 101, 103 and 104. Surfaces 102 and 105 are spaced radially outwardly from the outer periphery of bearing 82.

Bearing 82 is centrally formed with a cylindrically smooth through bore 120 which rotatably and coaxially receives the outboard end of shaft 30. The axially oppositely directed end faces of bearing 82 are flat (except for an integral annular boss 122) and are contained in parallel spaced apart planes that perpendicularly intersect the longitudinal axis of bore 120. A disc type spring 124 may be provided to bias bearing 82 snugly into the socket defined by cavities 86 and 88 and to thereby take up any axial loose play of the bearing due to manufacturing tolerance variations. Spring 124, which is slidably mounted on shaft 30, is axially deformed between a commutator insulating sleeve 126 and boss 122. Boss 122 is formed concentrically about the axis of bore 120. Shaft 30 extends coaxially through sleeve 126.

It will be appreciated that axial motion of bearing 82 is confined by abutment of the outer segmental, spherically contoured periphery of bearing 82 with seating surfaces 100, 101, 103 and 104.

As shown in FIG. 3 and 5, shell 60 may further be formed interiorly with two axially spaced protuberances or boss portions 130 and 132. Portions 130 and 132 project inwardly from surfaces 100 and 101 and are loosely received in a straight sided, outwardly opening, longitudinally extending groove 134. Groove 134 is formed in the outer periphery of bearing 82. Abutment of portions 130 and 132 with the side walls of groove 134 limit the universal motion of bearing 82 in the socket defined by cavities 86 and 88. In addition, abutment of portions 130 and 132 with the side edges of groove 134 confine bearing 82 against rotation with shaft 30.

As shown in FIGS. 2-5, cavities 86 and 88 may be provided with rearward extensions which define a cylindrical compartment 140 (FIG. 2) that axially spans the space between seat 107 and the back wall of casing 22. A circular pad of oil soaked felt 142 or the like may be trapped in compartment 140 and compressed between the opposing flat end face of bearing 82 and the opposing back wall portion of casing 22 to provide a supply of lubricant to bearing 82.

The structure shown in FIGS. 6 and 7 is the same as that shown in FIGS. 1-5 except that bearing 82 has been replaced by an annular bushing or roller bearing 150 having an outer cylindrical periphery 152 of uniform diameter. Bearing 150 coaxially receives and journals the outboard end of shaft 30 to thereby cooperate with bearing 83 for rotatably supporting shaft 30 in casing 22.

As shown, the outer periphery 152 of bearing 150 interfittingly seats against seating surfaces 103 and 105. Bearing 150 is confined against axial motion by abutment with the interior cavity surfaces defining shoulders 114 and 115. The axially opposite directed bearing end faces, which abut shoulders 114 and 115, may be flat and parallel as shown. Bearing 150 is thus trapped in place in casing 22 only by separable seating engagement with surfaces 103, 105 and 110-113. Bearing 150 is thus clamped or tapped between shells 60 and 62.

It will be appreciated that bearing seat 108 may accommodate any type of bearing having an outer cylindrical periphery.

From the foregoing it is clear that the bearing support structure defined by seats 106-108 will accommodate bearings having either a spherically contoured outer periphery or cylindrically contoured outer periphery without requiring any modification to the casing or the addition or deletion of any bearing support or holder parts.

What is claimed and desired to be secured by Letters Patent is:

1. A combination bearing seat structure for supporting a shaft-journalling bearing having either a spherically contoured outer periphery or a cylindrically contoured outer periphery, said combination bearing seat structure comprising surface means arranged to peripherally surround and support a shaft-journalling bearing, said surface means defining first and second axially spaced apart, annular-like spherically contoured bearing seats and an annular cylindrically contoured bearing seat disposed axially between said first and second seats, said first and second seats being contained in a substantially common envelope for engaging a bearing having a spherically contoured outer periphery, and said cylindrically contoured seat axially spanning the space between said first and second seats for engaging a bearing having a cylindrically contoured outer periphery.

2. The combination bearing seat structure defined in claim 1 wherein said first, second and cylindrically contoured seats are formed about a common longitudinal axis and wherein said surface means is stepped to recess said cylindrically contoured seat radially outwardly relative to said first and second seats and to provide a pair of axially opposed, spaced apart shoulders, one of said shoulders defining a juncture between said first seat and said cylindrically contoured seat, and the other of said shoulders defining a juncture between said second seat and said cylindrically contoured seat, said shoulders being disposed to abut and axially confine a bearing having a cylindrically contoured outer periphery when such a bearing is seated against said cylindrically contoured seat.

3. The combination bearing seat structure defined in claim 2 wherein said surface means is formed as a part of a power tool casing and defines an internal bearing-receiving socket in said casing.

4. The combination bearing seat structure defined in claim 3 wherein said casing is divided into a pair of complementary, separately formed shells at least in the region of said socket and along a plane containing said longitudinal axis, each of said shells defining segments of said first, second and cylindrically contoured seats, said shells being arranged to trap therebetween a bearing having either a spherically contoured outer periphery or a cylindrically contoured outer periphery, said shells confining one bearing with the spherically contoured outer periphery only by separable seating surface engagement of said first and second seats with said spherically contoured outer periphery of said one bearing, and said shells alternatively confining another bearing with the cylindrically contoured outer periphery only by separable seating surface engagement of said cylindrically contoured seat with said cylindrically contoured outer periphery and said shoulders with the opposite end faces of the bearing having the cylindrically contoured outer periphery.

5. A casing for a power-operated tool comprising interior surface means forming a socket for receiving a shaft-journalling bearing having either an outer spherically contoured bearing seat-engaging periphery or an outer cylindrically contoured bearing seat-engaging periphery, said surface means having first bearing seat means for engaging and supporting a shaft-journalling bearing having said outer spherically contoured bearing seat-engaging periphery and second bearing seat means for engaging and supporting a shaft-journalling bearing having said outer cylindrically contoured bearing seat-engaging periphery.

6. The casing defined in claim 5 wherein at least that part of said casing containing said surface means and forming said socket is divided into a pair of separately formed, mating shells along a plane substantially containing the longitudinal axis of said socket, each of said shells defining segments of said first and second bearing seat means, said shells being rigidly secured together to trap between said segments a shaft-journalling bearing having either said spherically contoured bearing seat-engaging periphery or said cylindrically contoured bearing seat-engaging periphery.

7. The casing defined in claim 5 comprising a body portion, said surface means being formed interiorly on said body portion, at least said body portion being divided into a pair of mating, separately formed shells along a plane containing the longitudinal axis of said socket, each of said shells defining segments of said first and second bearing seat means, said shells being rigidly secured together to trap between said segments a shaft-journalling bearing having either said spherically contoured bearing seat-engaging periphery or said cylindrically contoured bearing seat-engaging periphery, said shells further defining complementary cavities that are configured to receive a drive mechanism that imparts motion to a tool.

8. The casing defined in claim 7 further comprising a handle portion to provide for the portable, hand-manipulation of said power-operated tool, at least a complementary pair of said cavities being configured to receive an electric motor having a shaft-mounted armature and a stator and forming a pair of said drive mechanism.

9. The casing defined in claim 8 wherein said at least a pair of said complementary cavities are configured to locate said motor in a position where the rotational axis of said motor substantially axially aligns with the longitudinal axis of said socket, said socket being arranged relative to said motor-receiving cavities to receive one of a plurality of bearings that journal an armature shaft on which said armature is mounted.

10. The casing defined in claim 5 wherein said first bearing seat means comprises first and second axially spaced apart, spherically contoured, annular-like bearing seats, and wherein said second bearing seat means comprises an annular cylindrically contoured bearing seat disposed axially between said first and second seats, said first and second seats being contained in a substantially common spherical envelope for engaging a bearing having said spherically contoured bearing seat-engaging periphery, and said cylindrically contoured bearing seat spanning the space between said first and second seats for engaging a bearing having said cylindrically contoured bearing seat-engaging periphery, said first, second and cylindrically contoured seats being formed along a common longitudinal axis.

11. The casing defined in claim 10 wherein said surface means is stepped to recess said cylindrically contoured seat radially outwardly relative to said first and second seats and to provide a pair of axially opposed, spaced apart shoulders, one of said shoulders defining a juncture between said first seat and said cylindrically contoured seat, and the other of said shoulders defining a juncture between said second seat and said cylindrically contoured seat, said shoulders being disposed to abut and axially confine a bearing having said cylindrically contoured bearing seat-engaging periphery when such a bearing is seated against said cylindrically contoured seat.

12. The casing defined in claim 11 comprising a body portion, said surface means being formed on said body portion, and at least said body portion being divided into a pair of separately formed complementary shells, each of said shells defining segments of said first, second and cylindrically contoured seats, and said shells further defining complementary cavities that are configured and arranged to receive an electric motor which forms a part of a drive mechanism for imparting motion to a tool, said socket being arranged relative to said cavities to receive one of a plurality of bearings that journals an armature shaft of said motor.

13. A combination bearing seat structure for supporting a shaft-journalling bearing having either one of two differently configured outer peripheral bearing seat-engaging surfaces, said combination bearing seat structure comprising surface means arranged to peripherally surround a shaft-journalling bearing having either one of said peripheral bearing seat-engaging surfaces, said surface means having first bearing seat means for engaging and supporting a bearing having one of said two differently configured outer peripheral bearing seat-engaging surfaces and second bearing seat means for engaging and supporting a bearing having the other of said two differently configured outer peripheral bearing seat engaging surfaces.

14. The combination bearing seat structure defined in claim 13 wherein said surface means defines a socket for receiving a shaft-journalling bearing having either one of said two differently configured outer peripheral bearing seat-engaging surfaces, said first bearing seat means being configured to interfit with said one of said two differently configured outer peripheral bearing seat-engaging surfaces, and said second bearing seat means being configured to interfit with said other of said two different configured outer peripheral bearing seat-engaging surfaces.

15. The combination bearing seat structure defined in claim 14 wherein said second bearing seat means is recessed relative to said first bearing seat means to be spaced from a bearing having said one of said two differently configured outer peripheral bearing seat-engaging surfaces.

* * * * *